US011019161B2

(12) United States Patent
Raichelgauz et al.

(10) Patent No.: US 11,019,161 B2
(45) Date of Patent: May 25, 2021

(54) SYSTEM AND METHOD FOR PROFILING USERS INTEREST BASED ON MULTIMEDIA CONTENT ANALYSIS

(71) Applicant: Cortica, Ltd., Tel Aviv (IL)

(72) Inventors: Igal Raichelgauz, Tel Aviv (IL);
Karina Odinaev, Tel Aviv (IL);
Yehoshua Y. Zeevi, Haifa (IL)

(73) Assignee: CORTICA, LTD., Tel Aviv (IL)

( * ) Notice: Subject to any disclaimer, the term of this patent is extended or adjusted under 35 U.S.C. 154(b) by 100 days.

(21) Appl. No.: 13/856,201

(22) Filed: Apr. 3, 2013

(65) Prior Publication Data

US 2013/0227023 A1 Aug. 29, 2013

Related U.S. Application Data

(63) Continuation-in-part of application No. 13/624,397, filed on Sep. 21, 2012, now Pat. No. 9,191,626, which
(Continued)

(51) Int. Cl.
*H04L 29/08* (2006.01)
*H04N 7/173* (2011.01)
(Continued)

(52) U.S. Cl.
CPC ............ *H04L 67/22* (2013.01); *G06F 16/958* (2019.01); *H04H 60/31* (2013.01); *H04H 60/33* (2013.01);
(Continued)

(58) Field of Classification Search
CPC ................................ H04L 67/22; G06F 16/958
See application file for complete search history.

(56) References Cited

U.S. PATENT DOCUMENTS 4,733,353 A  3/1988  Jaswa
4,932,645 A  6/1990  Schorey et al.
(Continued)

FOREIGN PATENT DOCUMENTS

EP  1085464 A3  1/2007
WO  02/31764  4/2002
(Continued)

OTHER PUBLICATIONS

Vallet, David, et al. "Personalized content retrieval in context using ontological knowledge." IEEE Transactions on circuits and systems for video technology 17.3 (2007): 336-346.*
(Continued)

*Primary Examiner* — Miranda M Huang
*Assistant Examiner* — Kevin W Figueroa
(74) *Attorney, Agent, or Firm* — Reches Patent (57) ABSTRACT

A method and system for profiling interests of users based on multimedia content analysis and creating users' profiles respective thereof is provided. The method comprises receiving a tracking information gathered with respect to an interaction of a user with at least one multimedia element displayed on a user node; determining a user impression respective of at least one multimedia content element using the received tracking information; generating at least one signature for the at least one multimedia element; determining at least a concept of the at least one multimedia element using the at least one generated signature, wherein an interest of the user is determined respective of the concept; creating a user profile to include at least the user interest; and storing the user profile in a data warehouse.

22 Claims, 5 Drawing Sheets

Related U.S. Application Data is a continuation-in-part of application No. 13/344,400, filed on Jan. 5, 2012, now Pat. No. 8,959,037.

(60) Provisional application No. 61/766,016, filed on Feb. 18, 2013.

(51) Int. Cl.

| | | |
|---|---|---|
| *H04N 21/258* | (2011.01) | |
| *H04N 21/2668* | (2011.01) | |
| *H04H 60/46* | (2008.01) | |
| *H04N 21/466* | (2011.01) | |
| *H04H 60/33* | (2008.01) | |
| *H04H 60/31* | (2008.01) | |
| *H04H 60/40* | (2008.01) | |
| *H04H 60/56* | (2008.01) | |
| *H04H 60/66* | (2008.01) | |
| *H04N 21/81* | (2011.01) | |
| *H04H 60/37* | (2008.01) | |
| *G06F 16/958* | (2019.01) | |

(52) U.S. Cl.
CPC .......... *H04H 60/37* (2013.01); *H04H 60/40* (2013.01); *H04H 60/46* (2013.01); *H04H 60/56* (2013.01); *H04H 60/66* (2013.01); *H04N 7/17318* (2013.01); *H04N 21/25891* (2013.01); *H04N 21/2668* (2013.01); *H04N 21/466* (2013.01); *H04N 21/8106* (2013.01)

(56) References Cited

U.S. PATENT DOCUMENTS

| | | | |
|---|---|---|---|
| 4,972,363 | A | 11/1990 | Nguyen et al. |
| 5,214,746 | A | 5/1993 | Fogel et al. |
| 5,307,451 | A | 4/1994 | Clark |
| 5,412,564 | A | 5/1995 | Ecer |
| 5,436,653 | A | 7/1995 | Ellis et al. |
| 5,568,181 | A | 10/1996 | Greenwood et al. |
| 5,638,425 | A | 6/1997 | Meador et al. |
| 5,745,678 | A | 4/1998 | Herzberg et al. |
| 5,763,069 | A | 6/1998 | Jordan |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,978,754 | A | 11/1999 | Kumano |
| 5,991,306 | A | 11/1999 | Burns et al. |
| 6,052,481 | A | 4/2000 | Grajski et al. |
| 6,070,167 | A | 5/2000 | Qian et al. |
| 6,076,088 | A | 6/2000 | Paik et al. |
| 6,122,628 | A | 9/2000 | Castelli et al. |
| 6,128,651 | A | 10/2000 | Cezar |
| 6,137,911 | A | 10/2000 | Zhilyaev |
| 6,144,767 | A | 11/2000 | Bottou et al. |
| 6,147,636 | A | 11/2000 | Gershenson |
| 6,163,510 | A | 12/2000 | Lee et al. |
| 6,243,375 | B1 | 6/2001 | Speicher |
| 6,243,713 | B1 | 6/2001 | Nelson et al. |
| 6,275,599 | B1 | 8/2001 | Adler et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,507,672 | B1 | 1/2003 | Watkins et al. |
| 6,523,046 | B2 | 2/2003 | Liu et al. |
| 6,524,861 | B1 | 2/2003 | Anderson |
| 6,550,018 | B1 | 4/2003 | Abonamah et al. |
| 6,557,042 | B1 | 4/2003 | He et al. |
| 6,594,699 | B1 | 7/2003 | Sahai et al. |
| 6,601,026 | B2 | 7/2003 | Appelt et al. |
| 6,611,628 | B1 | 8/2003 | Sekiguchi et al. |
| 6,618,711 | B1 | 9/2003 | Ananth |
| 6,640,015 | B1 | 10/2003 | Lafruit |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,681,032 | B2 | 1/2004 | Bortolussi et al. |
| 6,704,725 | B1 | 3/2004 | Lee |
| 6,732,149 | B1 | 5/2004 | Kephart |
| 6,742,094 | B2 | 5/2004 | Igari |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,813,395 | B1 | 11/2004 | Kinjo |
| 6,819,797 | B1 | 11/2004 | Smith et al. |
| 6,845,374 | B1 | 1/2005 | Oliver et al. |
| 6,877,134 | B1 | 4/2005 | Fuller et al. |
| 6,901,207 | B1 | 5/2005 | Watkins |
| 6,938,025 | B1 | 8/2005 | Lulich et al. |
| 6,985,172 | B1 | 1/2006 | Rigney et al. |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,023,979 | B1 | 4/2006 | Wu et al. |
| 7,043,473 | B1 | 5/2006 | Rassool et al. |
| 7,047,033 | B2 | 5/2006 | Wyler |
| 7,158,681 | B2 | 1/2007 | Persiantsev |
| 7,199,798 | B1 | 4/2007 | Echigo et al. |
| 7,215,828 | B2 | 5/2007 | Luo |
| 7,260,564 | B1 | 8/2007 | Lynn et al. |
| 7,277,928 | B2 | 10/2007 | Lennon |
| 7,299,261 | B1 | 11/2007 | Oliver et al. |
| 7,302,117 | B2 | 11/2007 | Sekiguchi et al. |
| 7,313,805 | B1 | 12/2007 | Rosin et al. |
| 7,340,358 | B2 | 3/2008 | Yoneyama |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,526,607 | B1 | 4/2009 | Singh et al. |
| 7,529,659 | B2 | 5/2009 | Wold |
| 7,536,417 | B2 | 5/2009 | Walsh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,660,737 | B1 | 2/2010 | Lim et al. |
| 7,694,318 | B2 | 4/2010 | Eldering et al. |
| 7,697,791 | B1 | 4/2010 | Chan |
| 7,769,221 | B1 | 8/2010 | Shakes et al. |
| 7,788,132 | B2 | 8/2010 | Desikan et al. |
| 7,801,893 | B2 | 9/2010 | Gulli |
| 7,836,054 | B2 | 11/2010 | Kawai et al. |
| 7,860,895 | B1 | 12/2010 | Scofield |
| 7,904,503 | B2 | 3/2011 | Van De Sluis |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,023,739 | B2 | 9/2011 | Hohimer et al. |
| 8,036,893 | B2 | 10/2011 | Reich |
| 8,098,934 | B2 | 1/2012 | Vincent |
| 8,112,376 | B2 | 2/2012 | Raichelgauz et al. |
| 8,266,185 | B2 | 9/2012 | Raichelgauz et al. |
| 8,275,764 | B2 | 9/2012 | Jeon |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |

(56) References Cited

U.S. PATENT DOCUMENTS

| | | |
|---|---|---|
| RE44,225 E | 5/2013 | Aviv |
| 8,457,827 B1 | 6/2013 | Ferguson et al. |
| 8,495,489 B1 | 7/2013 | Everingham |
| 8,527,978 B1 | 9/2013 | Sallam |
| 8,548,828 B1 | 10/2013 | Longmire |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,222 B1 | 11/2014 | Rodriguez |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Ichelgauz et al. |
| 9,256,668 B2 | 2/2016 | Ichelgauz et al. |
| 9,298,763 B1 | 3/2016 | Zack |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0019882 A1 | 2/2002 | Soejima |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0113812 A1 | 8/2002 | Walker et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2002/0184505 A1 | 12/2002 | Mihcak et al. |
| 2003/0005432 A1 | 1/2003 | Ellis et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Beckerman et al. |
| 2004/0003394 A1 | 1/2004 | Ramaswamy |
| 2004/0025180 A1 | 2/2004 | Begeja et al. |
| 2004/0059736 A1 | 3/2004 | Willse |
| 2004/0068510 A1 | 4/2004 | Hayes et al. |
| 2004/0091111 A1 | 5/2004 | Levy |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 | 5/2006 | Leurs |

(56) References Cited

U.S. PATENT DOCUMENTS

| | | |
|---|---|---|
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0040277 A1 | 2/2008 | Dewitt |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0163288 A1 | 7/2008 | Ghosal et al. |
| 2008/0165861 A1 | 7/2008 | Wen |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0208106 A1 | 8/2009 | Dunlop et al. |
| 2009/0216639 A1 | 8/2009 | Kapczynski et al. |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0278934 A1 | 11/2009 | Ecker |
| 2009/0282218 A1 | 11/2009 | Raichelgauz et al. |
| 2009/0297048 A1* | 12/2009 | Slotine ................ G06K 9/4671 382/224 |
| 2010/0023400 A1 | 1/2010 | Dewitt |
| 2010/0042646 A1 | 2/2010 | Raichelqauz |
| 2010/0082684 A1* | 4/2010 | Churchill et al. ............ 707/784 |
| 2010/0088321 A1 | 4/2010 | Soloman et al. |
| 2010/0104184 A1 | 4/2010 | Bronstein |
| 2010/0106857 A1 | 4/2010 | Wyler |
| 2010/0111408 A1 | 5/2010 | Matsuhira |
| 2010/0125569 A1 | 5/2010 | Nair |
| 2010/0162405 A1 | 6/2010 | Cook |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0268524 A1* | 10/2010 | Nath et al. ....................... 703/23 |
| 2010/0284604 A1 | 11/2010 | Chrysanthakopoulos |
| 2010/0306193 A1 | 12/2010 | Pereira |
| 2010/0312736 A1 | 12/2010 | Kello |
| 2010/0318493 A1 | 12/2010 | Wesseling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035289 A1 | 2/2011 | King et al. |
| 2011/0038545 A1 | 2/2011 | Bober |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0119287 A1 | 5/2011 | Chen |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0208822 A1 | 8/2011 | Rathod |
| 2011/0218946 A1* | 9/2011 | Stern .................. H04L 12/1859 706/12 |
| 2011/0246566 A1* | 10/2011 | Kashef .............. G06F 17/30035 709/203 |
| 2011/0251896 A1 | 10/2011 | Impollonia et al. |
| 2011/0276680 A1* | 11/2011 | Rimon ............... H04N 21/2543 709/224 |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1* | 6/2012 | Carroll et al. .................. 725/32 |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |

(56) References Cited

U.S. PATENT DOCUMENTS

| | | | |
|---|---|---|---|
| 2012/0299961 A1 | 11/2012 | Ramkumar et al. | |
| 2012/0301105 A1 | 11/2012 | Rehg et al. | |
| 2012/0330869 A1 | 12/2012 | Durham | |
| 2012/0331011 A1 | 12/2012 | Raichelgauz et al. | |
| 2013/0031489 A1* | 1/2013 | Gubin | G06Q 50/01 |
| | | | 715/753 |
| 2013/0066856 A1 | 3/2013 | Ong et al. | |
| 2013/0067035 A1 | 3/2013 | Amanat et al. | |
| 2013/0067364 A1 | 3/2013 | Berntson et al. | |
| 2013/0086499 A1 | 4/2013 | Dyor et al. | |
| 2013/0089248 A1 | 4/2013 | Remiszewski | |
| 2013/0103814 A1 | 4/2013 | Carrasco | |
| 2013/0104251 A1 | 4/2013 | Moore et al. | |
| 2013/0159298 A1 | 6/2013 | Mason | |
| 2013/0173635 A1 | 7/2013 | Sanjeev | |
| 2013/0212493 A1 | 8/2013 | Krishnamurthy | |
| 2013/0226820 A1 | 8/2013 | Sedota, Jr. | |
| 2013/0226930 A1 | 8/2013 | Amgren et al. | |
| 2013/0283401 A1 | 10/2013 | Pabla et al. | |
| 2013/0325550 A1 | 12/2013 | Varghese et al. | |
| 2013/0332951 A1 | 12/2013 | Gharaat et al. | |
| 2014/0019264 A1 | 1/2014 | Wachman et al. | |
| 2014/0025692 A1 | 1/2014 | Pappas | |
| 2014/0059443 A1 | 2/2014 | Tabe | |
| 2014/0095425 A1 | 4/2014 | Sipple | |
| 2014/0111647 A1 | 4/2014 | Atsmon | |
| 2014/0125703 A1 | 5/2014 | Roveta | |
| 2014/0147829 A1 | 5/2014 | Jerauld | |
| 2014/0152698 A1 | 6/2014 | Kim et al. | |
| 2014/0169681 A1 | 6/2014 | Drake | |
| 2014/0176604 A1 | 6/2014 | Venkitaraman et al. | |
| 2014/0188786 A1 | 7/2014 | Raichelgauz et al. | |
| 2014/0193077 A1 | 7/2014 | Shiiyama et al. | |
| 2014/0201330 A1 | 7/2014 | Lozano Lopez | |
| 2014/0250032 A1 | 9/2014 | Huang et al. | |
| 2014/0282655 A1 | 9/2014 | Roberts | |
| 2014/0300722 A1 | 10/2014 | Garcia | |
| 2014/0310825 A1 | 10/2014 | Raichelgauz et al. | |
| 2014/0330830 A1 | 11/2014 | Raichelgauz et al. | |
| 2014/0341476 A1 | 11/2014 | Kulick et al. | |
| 2014/0379477 A1 | 12/2014 | Sheinfeld | |
| 2015/0033150 A1 | 1/2015 | Lee | |
| 2015/0100562 A1 | 4/2015 | Kohlmeier et al. | |
| 2015/0117784 A1 | 4/2015 | Lin | |
| 2015/0120627 A1 | 4/2015 | Hunzinger et al. | |
| 2015/0134688 A1 | 5/2015 | Jing | |
| 2015/0254344 A1* | 9/2015 | Kulkarni | G06F 17/30799 |
| | | | 707/747 |
| 2015/0286742 A1 | 10/2015 | Zhang et al. | |
| 2015/0289022 A1 | 10/2015 | Gross | |
| 2015/0324356 A1 | 11/2015 | Gutierrez et al. | |
| 2015/0363644 A1 | 12/2015 | Wnuk | |
| 2016/0007083 A1 | 1/2016 | Gurha | |
| 2016/0026707 A1 | 1/2016 | Ong et al. | |
| 2016/0210525 A1 | 7/2016 | Yang | |
| 2016/0221592 A1 | 8/2016 | Puttagunta | |
| 2016/0306798 A1 | 10/2016 | Guo et al. | |
| 2016/0342683 A1 | 11/2016 | Kwon | |
| 2016/0357188 A1 | 12/2016 | Ansari | |
| 2017/0017638 A1 | 1/2017 | Satyavarta et al. | |
| 2017/0032257 A1 | 2/2017 | Sharifi | |
| 2017/0041254 A1 | 2/2017 | Agara Venkatesha Rao | |
| 2017/0109602 A1 | 4/2017 | Kim | |
| 2017/0154241 A1 | 6/2017 | Shambik et al. | |
| 2017/0255620 A1 | 9/2017 | Raichelgauz | |
| 2017/0262437 A1 | 9/2017 | Raichelgauz | |
| 2017/0323568 A1 | 11/2017 | Inoue | |
| 2018/0081368 A1 | 3/2018 | Watanabe | |
| 2018/0101177 A1 | 4/2018 | Cohen | |
| 2018/0157916 A1 | 6/2018 | Doumbouya | |
| 2018/0158323 A1 | 6/2018 | Takenaka | |
| 2018/0204111 A1 | 7/2018 | Zadeh | |
| 2019/0005726 A1 | 1/2019 | Nakano | |
| 2019/0039627 A1 | 2/2019 | Yamamoto | |
| 2019/0043274 A1 | 2/2019 | Hayakawa | |
| 2019/0045244 A1 | 2/2019 | Balakrishnan | |
| 2019/0056718 A1 | 2/2019 | Satou | |
| 2019/0065951 A1 | 2/2019 | Luo | |
| 2019/0188501 A1 | 6/2019 | Ryu | |
| 2019/0220011 A1 | 7/2019 | Della Penna | |
| 2019/0317513 A1 | 10/2019 | Zhang | |
| 2019/0364492 A1 | 11/2019 | Azizi | |
| 2019/0384303 A1 | 12/2019 | Muller | |
| 2019/0384312 A1 | 12/2019 | Herbach | |
| 2019/0385460 A1 | 12/2019 | Magzimof | |
| 2019/0389459 A1 | 12/2019 | Berntorp | |
| 2020/0004248 A1 | 1/2020 | Healey | |
| 2020/0004251 A1 | 1/2020 | Zhu | |
| 2020/0004265 A1 | 1/2020 | Zhu | |
| 2020/0005631 A1 | 1/2020 | Visintainer | |
| 2020/0018606 A1 | 1/2020 | Wolcott | |
| 2020/0018618 A1 | 1/2020 | Ozog | |
| 2020/0020212 A1 | 1/2020 | Song | |
| 2020/0050973 A1 | 2/2020 | Stenneth | |
| 2020/0073977 A1 | 3/2020 | Montemerlo | |
| 2020/0090484 A1 | 3/2020 | Chen | |
| 2020/0097756 A1 | 3/2020 | Hashimoto | |
| 2020/0133307 A1 | 4/2020 | Kelkar | |
| 2020/0043326 A1 | 6/2020 | Tao | |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007/0049282 | 5/2007 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Foote, Jonathan, et al. "Content-Based Retrieval of Music and Audio", 1997 Institute of Systems Science, National University of Singapore, Singapore (Abstract).

Raichelgauz, I., et al., "Natural Signal Classification by Neural Cliques and Phase-Locked Attractors", pp. 6693-6697, Proceedings of the 28th IEEE, EMBS Annual International Conference, New York City, USA, Aug. 30-Sep. 3, 2006, downloaded on Mar. 12, 2009.

Ribert et al. "An Incremental Hierarchical Clustering", Visicon Interface 1999, pp. 586-591.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

(56) References Cited

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cernansky et al., "Feed-forward Echo State Networks"; Proceedings of International Joint Conference on Neural Networks, Montreal, Canada, Jul. 31-Aug. 4, 2005.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
IPO Examination Report under Section 18(3) for corresponding UK application No. GB1001219.3, dated May 30, 2012.
IPO Examination Report under Section 18(3) for corresponding UK application No: GB1001219.3, dated Sep. 12, 2011.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
International Search Report for the corresponding International Patent Application PCT/IL2006/001235; dated Nov. 2, 2008.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
International Search Authority: "Written Opinion of the International Searching Authority" (PCT Rule 43bis.1) including International Search Report for International Patent Application No. PCT/US2008/073852; dated Jan. 28, 2009.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), the 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
May et al., "The Transputer", Springer-Verlag, Berlin Heidelberg, 1989, teaches multiprocessing system.
Vailaya, et al., "Content-Based Hierarchical Classification of Vacation Images," I.E.E.E.: Multimedia Computing and Systems, vol. 1, 1999, East Lansing, MI, pp. 518-523.

(56) References Cited

OTHER PUBLICATIONS

Vallet, et al., "Personalized Content Retrieval in Context Using Ontological Knowledge," IEEE Transactions on circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Nam, et al., "Audio Visual Content-Based Violent Scene Characterization", Department of Electrical and Computer Engineering, Minneapolis, MN, 1998, pp. 353-357.
Shih-Fu Chang, et al., "VideoQ: A Fully Automated Video Retrieval System Using Motion Sketches", 1998, IEEE New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Brecheisen, et al., "Hierarchical Genre Classification for Large Music Collections", ICME 2006, pp. 1385-1388.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University Advent technical report, 2007, pp. 222-2006-8.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.

The International Search Report and the Written Opinion for PCT/US2017/015831, ISA/RU, Moscow, Russia, dated Apr. 20, 2017.
Lau et al., "Semantic Web Service Adaptation Model for a Pervasive Learning Scenario", 2008 IEEE Conference on nnovative Technologies in Intelligent Systems and Industrial Applications, 2008, pp. 98-103.
Ma et el. ("Semantics modeling based image retrieval system using neural networks" 2005 (Year: 2005).
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International Journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.

(56) References Cited

OTHER PUBLICATIONS

May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, 2-5 Sep. 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onlmage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available inline Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Guo et al, AdOn: An Intelligent Overlay Video Advertising System (Year: 2009).
Li et al ("Matching Commercial Clips from TV Streams Using a Unique, Robust and Compact Signature" 2005) (Year: 2005).
Stolberg et al ("Hibrid-Soc: a Multi-Core Soc Architecture for Multimedia Signal Processing" 2003).
Vallet et al ("Personalized Content Retrieval in Context Using Ontological Knowledge" Mar. 2007) (Year: 2007).
Jasinschi et al., "A Probabilistic Layered Framework for Integrating Multimedia Content and Context Information", 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

SYSTEM AND METHOD FOR PROFILING USERS INTEREST BASED ON MULTIMEDIA CONTENT ANALYSIS

CROSS-REFERENCE TO RELATED APPLICATIONS

This application claims priority from Provisional Application No. 61/766,016 filed on Feb. 18, 2013. This application is also a continuation-in-part (CIP) of U.S. patent application Ser. No. 13/624,397 filed on Sep. 21, 2012, now pending. The Ser. No. 13/624,397 Application is a continuation-in-part of:

(a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and, (c) U.S. patent application Ser. No. 12/084,150 with a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content, and more specifically to a system for profiling users' preferences based on their interaction with the multimedia content

BACKGROUND

With the abundance of data made available through various means in general and the Internet and world-wide web (WWW) in particular, a need to understand likes and dislikes of users has become essential for on-line businesses.

Prior art solutions provide several tools to identify users' preferences. Some prior art solutions actively require an input from the users to specify their interests. However, profiles generated for users based on their inputs may be inaccurate as the users tend to provide only their current interests, or only partial information due to their privacy concerns.

Other prior art solutions passively track the users' activity through particular web sites such as social networks. The disadvantage with such solutions is that typically limited information regarding the users is revealed, as users tend to provide only partial information due to privacy concerns. For example, users creating an account on Facebook® provide in most cases only the mandatory information required for the creation of the account.

It would be therefore advantageous to provide a solution that overcomes the deficiencies of the prior art by efficiently identifying preferences of users, and generating profiles thereof.

SUMMARY

Certain embodiments disclosed herein include a method for profiling interests of users based on multimedia content analysis and creating users' profiles respective thereof is provided. The method comprises receiving a tracking information gathered with respect to an interaction of a user with at least one multimedia element displayed on a user node; determining a user impression respective of at least one multimedia content element using the received tracking information; generating at least one signature for the at least one multimedia element; determining at least a concept of the at least one multimedia element using the at least one generated signature, wherein an interest of the user is determined respective of the concept; creating a user profile to include at least the user interest; and storing the user profile in a data warehouse.

Certain embodiments disclosed herein also include a method for profiling interests of users based on multimedia content analysis and creating users' profiles respective thereof. The method comprises receiving a tracking information gathered with respect to an upload of at least one multimedia element to at least one information source; generating at least one signature for the at least one multimedia element identified in the tracking information; determining at least a concept of the at least one multimedia element using the at least one generated signature, wherein an interest of the user is determined respective of the concept; creating a user profile to include at least the user interest; and storing the user profile in a data warehouse.

Certain embodiments disclosed herein also include a system for profiling interests of users based on multimedia content analysis and creating users' profiles respective thereof. The system comprises an interface to a network for receiving at least tracking information gathered with respect to an interaction of a user with at least one multimedia element displayed on a user node; a profiler for determining a user impression respective of at least one multimedia content element using the received tracking information, wherein the profiler is further configured to determine at least a concept of the at least one multimedia element using at least one signature generated for the at least one multimedia element and creating a user profile to include at least the user interest, wherein the interest of the user is determined respective of the concept; and a data warehouse for saving at least the user profile.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein enable the creation of a database of users' profiles based on their impression of multimedia content and the respective signatures. The user impression indicates the user's attention to a certain multimedia content or element. The multimedia content viewed by the user is analyzed and one or more matching signatures is generated respective thereto. Based on the signatures the concept of the multimedia content is determined. Thereafter, based on the concept or concepts, the user preferences are determined, and user's profile respective thereto is created. The profile and impressions for each user is saved in a data warehouse or a database.

As a non-limiting example, if a user views and interacts with images of pets and the generated user's impression respective of all these images is positive, the user's profile may be determined as an "animal lover". The profile of the user is then stored in the data warehouse for further use. An example for such further use may be to provide advertisements related to animal supplies to the user's device.

A user impression is determined by the period of time the user viewed or interacted with the multimedia content, a gesture received by the user device such as, a mouse click, a mouse scroll, a tap, and any other gesture on a device having touch screen display or a pointing device. According to another embodiment, a user impression may be determined based on matching between a plurality of multimedia content elements viewed by a user and their respective impression. According to yet another embodiment, a user impression may be generated based on multimedia content that the user uploads or shares on the web, such as social network websites. It should be noted that the user impression may be determined based on one or more of the above identified techniques.

Figure 1:
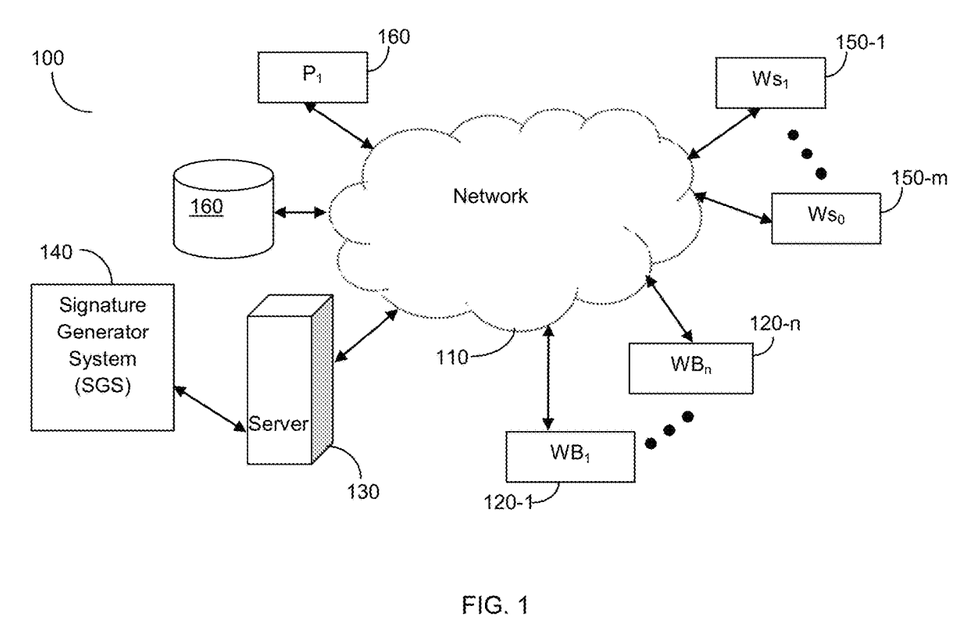
FIG. 1 is a schematic block diagram of a system for analyzing multimedia content displayed on a web-page according to one embodiment.

FIG. 1 shows an exemplary and non-limiting schematic diagram of a system 100 utilized to describe the various embodiments disclosed herein. As illustrated in FIG. 1, a network 110 enables the communication between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are client applications, such as web browsers (WB) 120-1 through 120-n (collectively referred to hereinafter as web browsers 120 or individually as a web browser 120). A web browser 120 is executed over a computing device which may be, for example, a personal computer (PC), a personal digital assistant (PDA), a mobile phone, a tablet computer, and the like. The computing device is configured to at least provide multimedia elements to servers connected to the network 110. According to one embodiment, each web browser 120 is installed with an add-on or is configured to embed an executable script (e.g., Java script) in a web page rendered on the browser 120. The executable script is downloaded from the server 130 or any of the web sources 150. The add-on and the script are collectively referred to as a "tracking agent", which is configured to track the user's impression with respect to multimedia content viewed by the user on a browser 120 or uploaded by the user through a browser 120.

The content displayed on the web browser is downloaded from a web source 150 and may be embedded in a web-page. The uploaded multimedia content can be locally saved in the computing device or can be captured by the device. For example, the multimedia content may be an image captured by a camera installed in the client device, a video clip saved in the device, and so on. A multimedia content may be, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The system 100 also includes a plurality of web sources 150-1 through 150-m (collectively referred to hereinafter as web sources 150 or individually as a web sources 150) being connected to the network 110. Each of the web sources 150 may be, for example, a web server, an application server, a data repository, a database, and the like.

The various embodiments disclosed herein are realized using the profiling server 130 and a signature generator system (SGS) 140. The profiling server 130 generates a profile for each user of a web browser 120 as will be discussed below.

The SGS 140 is configured to generate a signature respective of the multimedia elements or content fed by the profiling server 130. The process for generating the signatures is explained in more detail herein below with respect to FIGS. 4 and 5. Each of the profiling server 130 and the SGS 140 typically is comprised of a processing unit, such as processor (not shown) that is coupled to a memory. The memory contains instructions that can be executed by the processing unit. The profiling server 130 also includes an interface (not shown) to the network 110.

According to the disclosed embodiment, the tracking agent provides the profiling server 130 with tracking information related to the multimedia element viewed or uploaded by the user and the interaction of the user with the multimedia element. The information may include, but is not limited to, the multimedia element (or a URL referencing the element), the amount of time the user viewed the multimedia element, the user's gesture with respect to the multimedia element, a URL of a webpage that the element was viewed or uploaded to, and so on. The tracking information is provided for each multimedia element displayed on a user's web browser 120.

The server 130 then determines the user impression with respect to the received tracking information. The user impression may be determined per each multimedia element or group of elements. As noted above, the user impression indicates the user attention with respect a multimedia element. In one embodiment, the server 130 first filters the tracking information to remove details that cannot help in the determination of the user impression. For example, if the user hovered the element using his mouse for a very short time (e.g., less than 0.5 seconds), then such a measure is ignored. The server 130 then computes a quantitative measure for the impression. In one embodiment, for each input measure that is tracked by the tracking agent a predefined number is assigned. For example, a dwell time over the multimedia element of 2 seconds or less may be assigned with a '5'; whereas a dwell time of over 2 seconds may be assigned with the number '10'. A click on the element may increase the value of the quantitative measure. Then, the numbers related to the measures provided in the tracking information are accumulated. The total number is the quantitative measure of the impression. Thereafter, the server compares the quantitative measure to a predefined threshold, and if the number exceeds the threshold the impression is determined to positive.

The multimedia element or elements that are determined as having a positive user impression are sent to the SGS 140. The SGS 140 generates at least one signature for each multimedia element or each portion thereof. The generated signature(s) may be robust to noise and distortions as discussed below.

It should be appreciated that using signatures for profiling the user's interests, because signatures allow the accurate reorganization of multimedia elements in comparison, for example, to utilization of metadata. The signatures generated by the SGS 140 for the multimedia elements allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car, enables accurate recognition of the model of the car from any angle from which the picture was taken.

In one embodiment, the generated signatures are matched against a database of concepts 170 to identify a concept that can be associated with the signature, and hence the multimedia element. For example, an image of tulip would be associated with a concept structure of flowers. The techniques for generating concepts, concept structure, and a concept-based database are disclosed in a co-pending U.S. patent application Ser. No. 13/766,463, filed on Feb. 13, 2013, assigned to common assignee, is hereby incorporated by reference for all the useful information it contains.

The profiling server 130 using the identified concepts creates the user profile. That is, for each user, when a number of similar or identical concepts for multiple multimedia elements have been identified over time, the user's preference or interest can be established. The interest is saved to a user profile created for the user. For example, a concept of flowers may be determined as a user interest in 'flowers' or 'gardening'. In one embodiment, the user interest may simply be the identified concept. In another embodiment the interest may be determined using an association table which associates one or more identified concepts with a user interest. For example, the concept of 'flowers' and 'spring' may be associated with the interest of 'gardening'. Such an association table is maintained in the profiling server 130 or the data warehouse 160.

Figure 2:
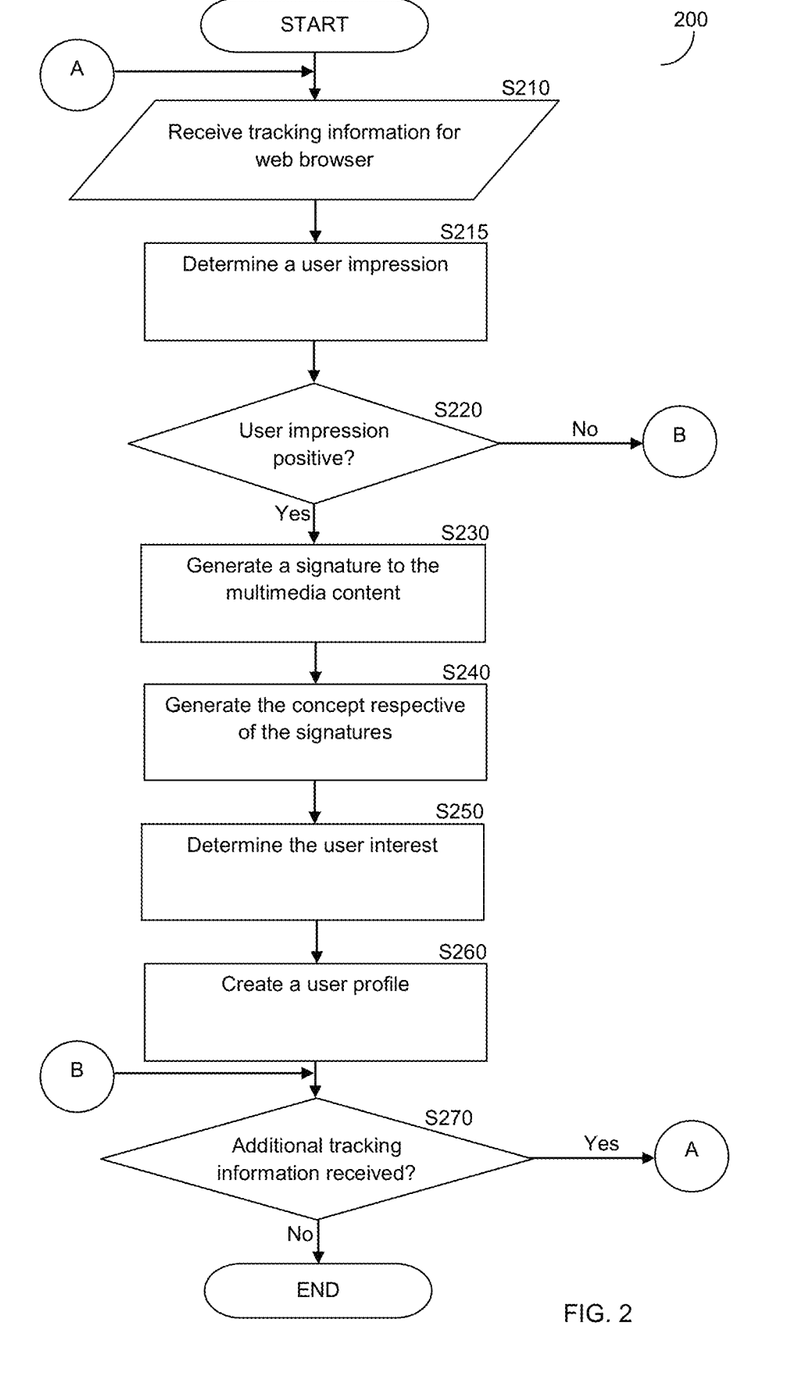
FIG. 2 is a flowchart describing a method for profiling a user's interest and creating a user profile based on an analysis of multimedia content according to one embodiment.

FIG. 2 depicts an exemplary and non-limiting flowchart 200 describing the process of creating users' profiles based on an analysis of multimedia content according to one embodiment. In S210, the tracking information collected by one of the web-browsers (e.g., web-browser 120-1) is received at the profiling server 130. As noted above, the tracking information is collected with respect to multimedia elements displayed over the web browser.

In S215, a user impression is determined based on the received tracking information. One embodiment for determining the user impression is described above. The user impression is determined for one or more multimedia elements identified in the tracking information. In S220, it is checked if the user impression is positive, and if so execution continues with S230; otherwise, execution proceeds with S270.

In S230, at least one signature to each of the multimedia elements identified in the tracking information is generated. As noted above, the tracking information may include the actual multimedia element(s) or a link thereto. In the latter case, each of the multimedia element(s) is first retrieved from its location. The at least one signature for each multimedia element is generated by the SGS 140 as described below. In S240, the concept respective of the signature generated for the multimedia element is determined. In one embodiment, S240 includes querying a concept-based database using the generated signatures. In S250, the user interest is determined by the server 130 respective of the concept or concepts associated with the identified elements.

One embodiment for determining the user interest is described below. As a non-limiting example, the user views a web-page that contains an image of a car. The image is then analyzed and a signature is generated respective thereto. As it appears that the user spent time above a certain threshold viewing the image of the car, the user's impression is determined as positive. It is therefore determined that the user's interest is cars.

In S260, a user profile is created in the data warehouse 150 and the determined user interest is saved therein. It should be noted that if a user profile already exists in the data warehouse 160, the receptive user profile is only updated to include the user interest determined in S250. It should be noted that a unique profile is created for each user of a web browser. The user can be identified by a unique identification number assigned, for example, by the tracking agent. The unique identification number does not reveal the user's identity. The user profile can be updated over time as additional tracking information is gathered and analyzed by the profiling server. In one embodiment, the server 130 analyzes the tracking information only when a sufficient amount of information has been collected. In S270, it is checked whether additional tracking information is received, and if so, execution continues with S210; otherwise, execution terminates.

Figure 3:
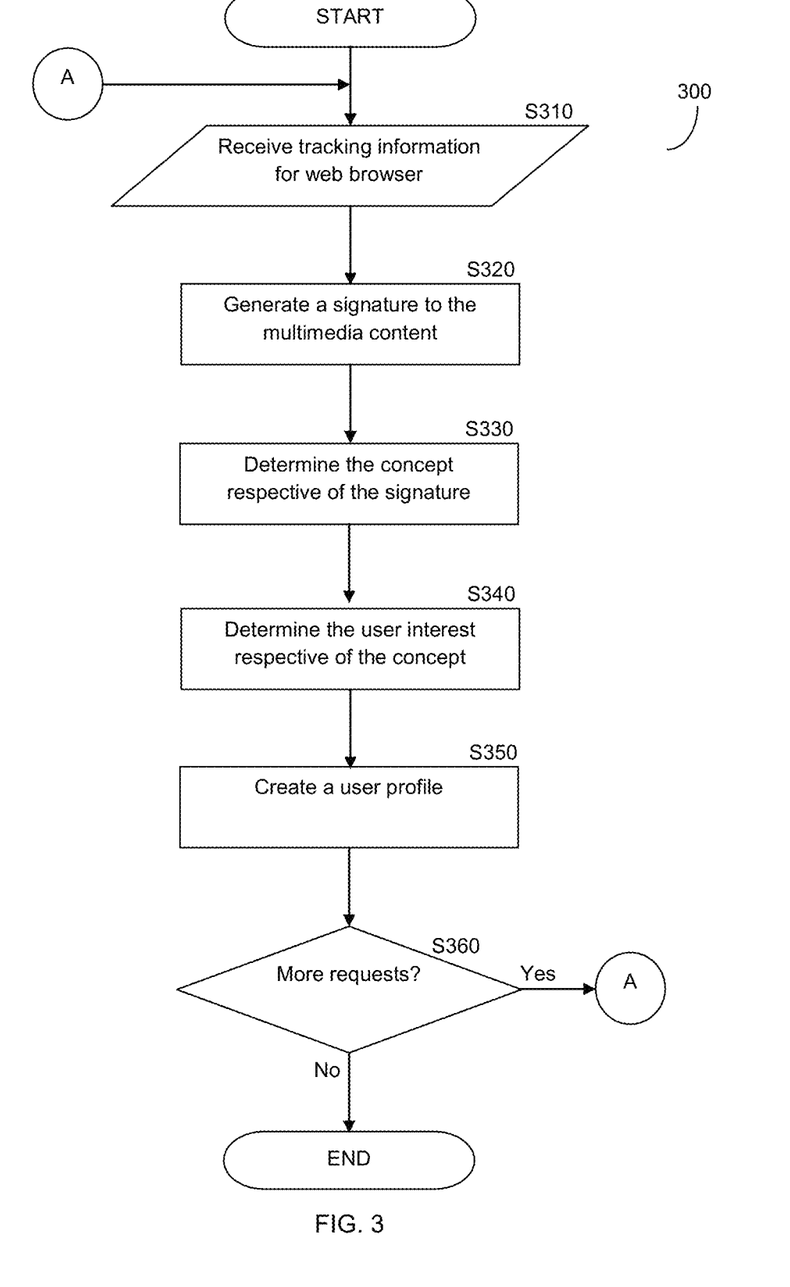
FIG. 3 is a flowchart describing a method for profiling a user's interest and creating a user profile based on an analysis of multimedia content according to another embodiment.

FIG. 3 depicts an exemplary and non-limiting flowchart 300 describing the process for profiling a user interest and creating a user profile based on an analysis of multimedia content according to another embodiment. In S310, tracking information gathered by the tracking agent is received at the server 130. According to this embodiment, the tracking information identifies multimedia elements (e.g., pictures, video clips, etc.) uploaded by the user from a web-browser 120 to one or more information sources. The information sources may include, but are not limited to, social networks, web blogs, news feeds, and the like. The social networks may include, for example, Google+®, Facebook®, Twitter®, Instagram, and so on. The tracking information includes the actual uploaded content or a reference thereto. This information may also contain the name of each of the information sources, text entered by the user with the uploaded image, and a unique identification code assigned to a user of the web browser.

In S320, at least one signature for each multimedia element identified in the tracking is generated. The signatures for the multimedia content elements are generated by a SGS 140 as described hereinabove. In S330, the concept respective of the at least one signature generated for each multimedia element is determined. In one embodiment, S330 includes querying a concept-based database using the generated signatures. In S340, the user interest is determined by the server 130 respective of the concept or concepts associated with the identified elements. According to one embodiment, if text is entered by the user and if such text is included in the tracking information, the input text is also processed by the server 130 to provide an indication if the element described a favorable interest.

In S350, a user profile is created in the data warehouse 150 and the determined user interest is saved therein. It should be noted that if a user profile already exists in the data warehouse 160, the receptive user profile is only updated to include the user interest determined in S340. In S360, it is checked whether there are additional requests, and if so, execution continues with S310; otherwise, execution terminates.

As a non-limiting example for the process described in FIG. 3, a picture of a user riding a bicycle is uploaded to the user's profile page in Facebook®. The image is then analyzed and a signature is generated respective thereto. A comment made by the user stating: "I love those field trips" is identified. Based on the concept of the uploaded picture and the user's comment, the user profile is determined as positive for field trips. The user profile is then stored in a data warehouse for further uses.

According to one embodiment, in such cases where several elements are identified in the tracking information, a signature is generated for each of these elements and the context of the multimedia content (i.e., collection of elements) is determined respective thereto. An exemplary technique for determining a context of multimedia elements based on signatures is described in detail in U.S. patent application Ser. No. 13/770,603, filed on Feb. 19, 2013, assigned to common assignee, which is hereby incorporated by reference for all the useful information it contains.

Figure 4:
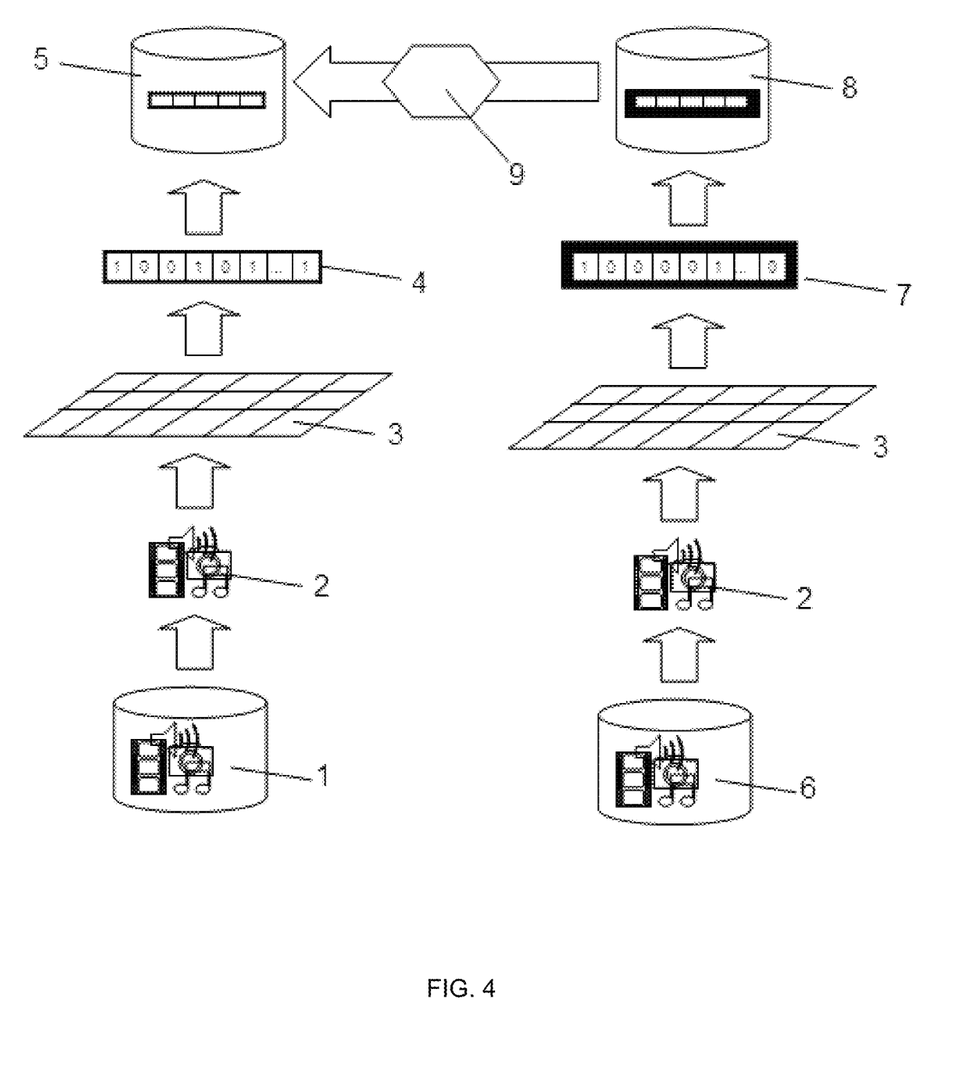
FIG. 4 is a block diagram depicting the basic flow of information in the signature generator system.
Figure 5:
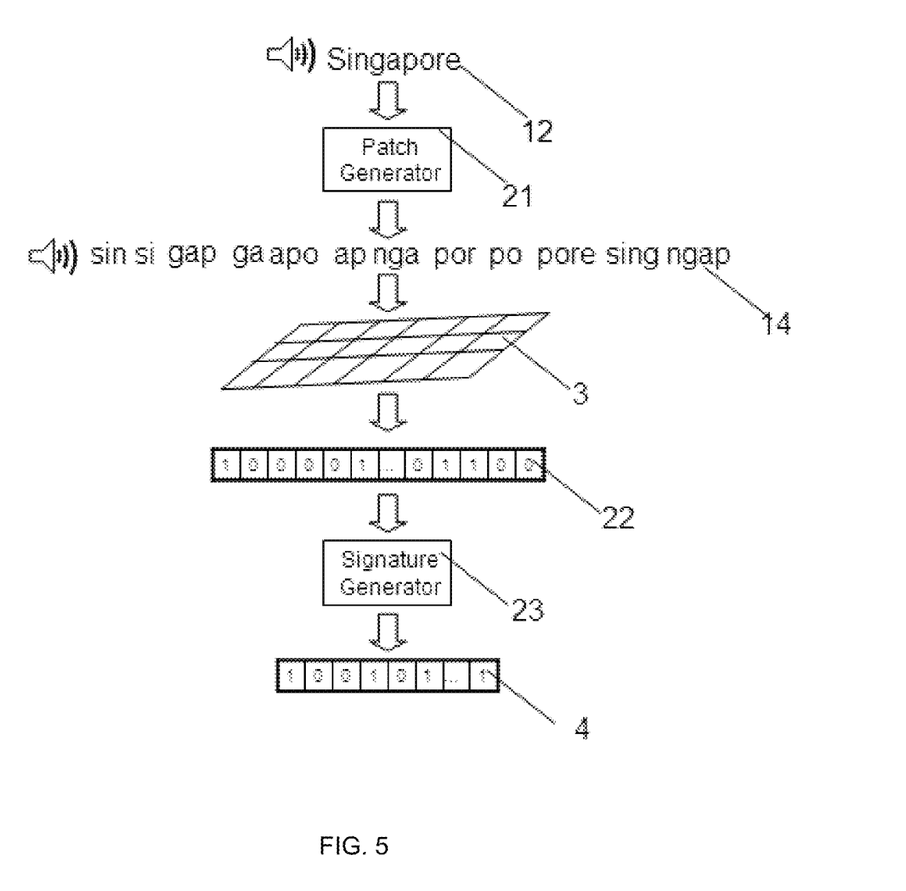
FIG. 5 is a diagram showing the flow of patches generation, response vector generation, and signature generation in a large-scale speech-to-text system.

FIGS. 4 and 5 illustrate the generation of signatures for the multimedia elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 5. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the profiling server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, $\Box$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values $Th_X$ are set differently for Signature generation and for Robust Signature generation. For example, for a certain distribution of values (for the set of nodes), the thresholds for Signature ($Th_S$) and Robust Signature ($Th_{RS}$) are set apart, after optimization, according to at least one or more of the following criteria:

1: For: $V_i > Th_{RS}$ $$1 - p(V > Th_S) - 1 - (1-\varepsilon)^l \ll 1$$

i.e., given that l nodes (cores) constitute a Robust Signature of a certain image I, the probability that not all of these l nodes will belong to the Signature of a same, but noisy image, $\tilde{\imath}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed.

Therefore, a signature can be used for the purpose of comparison to another signature without the need of comparison to the original data. The detailed description of the Signature generation can be found U.S. Pat. Nos. 8,326,775 and 8,312,031, assigned to common assignee, and are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the co-pending U.S. patent application Ser. No. 12/084,150 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for profiling interests of users based on multimedia content analysis and creating users' profiles respective thereof, comprising:
    receiving tracking information gathered with respect to at least one multimedia element viewed on a user node for display to the user and the interaction of the user with the at least one multimedia element displayed on the user node;
    determining at least one user impression indicative of the user's attention with respect to at least one multimedia content element based on the received tracking information;
    generating at least one signature for the at least one multimedia element responsive to the at least one multimedia element being determined to be associated with at least one positive user impression;
    preventing from generating a signature for the at least one multimedia element responsive to the at least one multimedia element being determined to be not associated with at least one positive user impression;
    determining at least a concept structure representative of a thematic feature of the at least one multimedia element using the at least one generated signature, wherein an interest of the user is determined with respect to a subject of the concept structure;
    creating a user profile including the user interest; and
    storing the user profile in a data warehouse.

2. The method of claim 1, wherein the tracking information includes any one of: the at least one multimedia element and a reference to the at least one multimedia element.

3. The method of claim 2, wherein the tracking information further includes at least one of: a measure of a period of time the user viewed the multimedia element, an indication of a user's gesture detected over the multimedia element, an indication of whether the at least one multimedia element was uploaded to an information source, an identification of the information source, and a unique identification code identifying the user.

4. The method of claim 3, wherein the user gesture is any one of: a scroll over the at least one multimedia element, a click on the at least one multimedia element, a tap on the at least one multimedia element, and a response to the at least one multimedia element.

5. The method of claim 1,
    wherein the concept structure comprises one or more signature reduced clusters and metadata associated with the one or more signature reduced clusters; wherein the one or more signature reduced clusters comprise multiple signatures.

6. The method of claim 1 wherein the determination of the user interest respective of the subject of the concept structure is performed using an association table that maps one or more subjects of identified concept structures to a user interest.

7. The method of claim 1, wherein the concept structure is determined by querying a concept-based database using the at least one signature.

8. The method of claim 1, wherein the at least one signature is robust to noise and distortion.

9. The method of claim 1, wherein the multimedia element is at least one of:
    an image, graphics, a video stream, a video clip, an audio stream, an audio clip, a video frame, a photograph, images of signals, and portions thereof.

10. The method of claim 1, further comprising: providing an advertisement to the user node respective of the user profile.

11. A non-transitory computer readable medium having stored thereon instructions for causing one or more processing units to execute the method according to claim 1.

12. The method according to claim 1 wherein generating of the at least one signature for the at least one multimedia element is executed by independent computational cores.

13. The method according to claim 1, wherein the at least one signature of the at least one multimedia element is at least one response of one or more neural networks to the at least one multimedia element.

14. A method for profiling interests of users based on multimedia content analysis and creating users' profiles respective thereof, comprising:
  receiving tracking information with respect to an uploading to at least one information source of at least one multimedia element displayed on a user node and the interaction of the user with the uploaded at least one multimedia element;
  generating at least one signature for the at least one multimedia element identified in the tracking information responsive to the at least one multimedia element being associated with a positive user impression;
  preventing from generating a signature for the at least one multimedia element responsive to the at least one multimedia element being determined to be not associated with at least one positive user impression;
  determining at least a concept structure representative of a thematic feature of the at least one multimedia element using the at least one generated signature, wherein an interest of the user is determined with respect to a subject of the concept structure;
  creating a user profile to include at least the user interest; and
  storing the user profile in a data warehouse.

15. The method of claim 14, wherein the tracking information includes an identification of the at least one multimedia element and an identification of the at least one information source, wherein the identification of the at least one multimedia element includes any one of: a reference to the at least one multimedia element and the actual multimedia element.

16. The method of claim 15, wherein the determination of the user interest respective of the subject of the concept structure is performed using an association table that maps one or more subjects of identified concept structures to a user interest.

17. A non-transitory computer readable medium having stored thereon instructions for causing one or more processing units to execute the method according to claim 14.

18. A system for profiling interests of users based on multimedia content analysis and creating users' profiles respective thereof, comprising:
  an interface to a network for receiving at least tracking information gathered with respect to an interaction of a user with at least one multimedia element displayed on a user node;
  a profiler for determining a user impression respective of at least one multimedia content element using the received tracking information,
  wherein the profiler is further configured to:
  generate at least one signature for the at least one multimedia element responsive to the at least one multimedia element being determined to be associated with at least one positive user impression;
  determine at least a concept structure representative of a thematic feature of the at least one multimedia element using the at least one generated signature, wherein an interest of the user is determined with respect to a subject of the concept structure;
  prevent from generating a signature for the at least one multimedia element responsive to the at least one multimedia element being determined to be not associated with at least one positive user impression;
  create a user profile including the user interest; and
  store the user profile in a data warehouse.

19. The system of claim 18, further comprising: a signature generator system (SGS) for generating the at least one signature for the at least one multimedia element, wherein the at least one signature is robust to noise and distortion.

20. The system of claim 19, wherein the signature generator system further comprises: a plurality of computational cores configured to receive the at least one multimedia element, each computational core of the plurality of computational cores having properties that are at least partly statistically independent from other of the plurality of computational cores, the properties are set independently of each other core.

21. The system of claim 18, wherein the tracking information further includes at least one of: a measure of a period of time the user viewed the multimedia element, an indication of a user's gesture detected over the multimedia element, an indication of whether the at least one multimedia element was uploaded to an information source, an identification of the information source, and a unique identification code identifying the user.

22. The system according to claim 18 wherein the concept structure comprises one or more signature reduced clusters and metadata associated with the one or more signature reduced clusters; wherein the one or more signature reduced clusters comprise multiple signatures.

* * * * *